United States Patent [19]

Douwes et al.

[11] Patent Number: 4,849,958
[45] Date of Patent: Jul. 18, 1989

[54] SYSTEM FOR RECORDING/READING INFORMATION ON/FROM A DISC, COMPRISING A DISC CASSETTE AND AN APPARATUS

[75] Inventors: Marcelles B. M. Douwes, Nuenen; Cornelis H. M. Van Rijsewijk, Eindhoven; Rudolf J. G. A. Van Der Hoorn, Nuenen; Cornelis Ouwerkerk, Eindhoven, all of Netherlands

[73] Assignee: U.S. Philips Corporation, New York, N.Y.

[21] Appl. No.: 116,609

[22] Filed: Nov. 3, 1987

[30] Foreign Application Priority Data

Nov. 3, 1986 [NL] Netherlands ............... 8602773
Jun. 24, 1987 [NL] Netherlands ............... 8701471

[51] Int. Cl.$^4$ .................. G11B 5/82; G11B 17/00
[52] U.S. Cl. ..................... 369/77.2; 369/291
[58] Field of Search .............. 369/77.2, 290, 291

[56] References Cited

U.S. PATENT DOCUMENTS

| | | | |
|---|---|---|---|
| 4,159,827 | 7/1979 | Torrington | 369/77.2 |
| 4,617,655 | 10/1986 | Aldenhoven | 369/77.2 |
| 4,707,821 | 11/1987 | Verhagen | 369/77.2 |
| 4,749,081 | 6/1988 | Carlson et al. | 369/77.2 |
| 4,755,982 | 7/1988 | Douwes | 369/77.2 |

FOREIGN PATENT DOCUMENTS 3135795 3/1983 Fed. Rep. of Germany.

Primary Examiner—Steven L. Stephan

[57] ABSTRACT

Cassette includes a disc (1) accommodated in an external sleeve (2) and retained therein by a disc holder (7) which closes the front of the sleeve (2) by means of a shutter (8), which retains the disc by retaining jaws (9), and which is latched in the sleeve by latching means (48) which can be moved by external means to remove the disc holder and the disc from the sleeve. Apparatus includes release levers (11) which release the disc holder (7) and an extraction mechanism (11, 13, 14) which withdraws the disc-holder/disc unit from the sleeve in such a way that the disc and disc holder remain inside the apparatus after withdrawal of the sleeve. Jaws (9) also retain the disc (2) outside the sleeve and can be moved relative to each other from the retaining position to a free position, in which the disc can be rotated and is clear of the retaining means, by external means only. Apparatus includes release means (11, 15, 20, 24) which ensure that inside the apparatus the jaws (9) are moved from the retaining position to the free position.

9 Claims, 4 Drawing Sheets

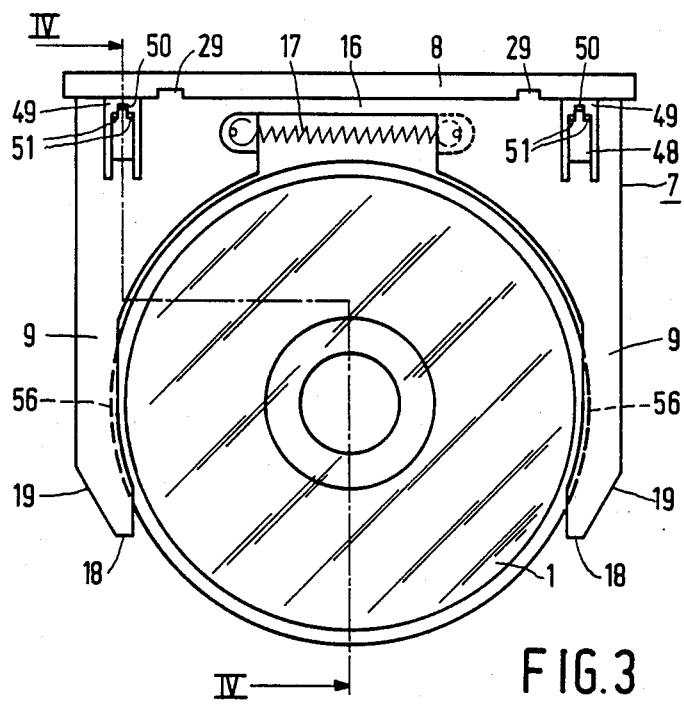
FIG.3
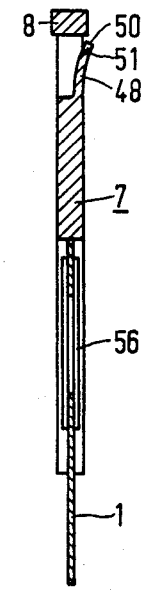
FIG.4
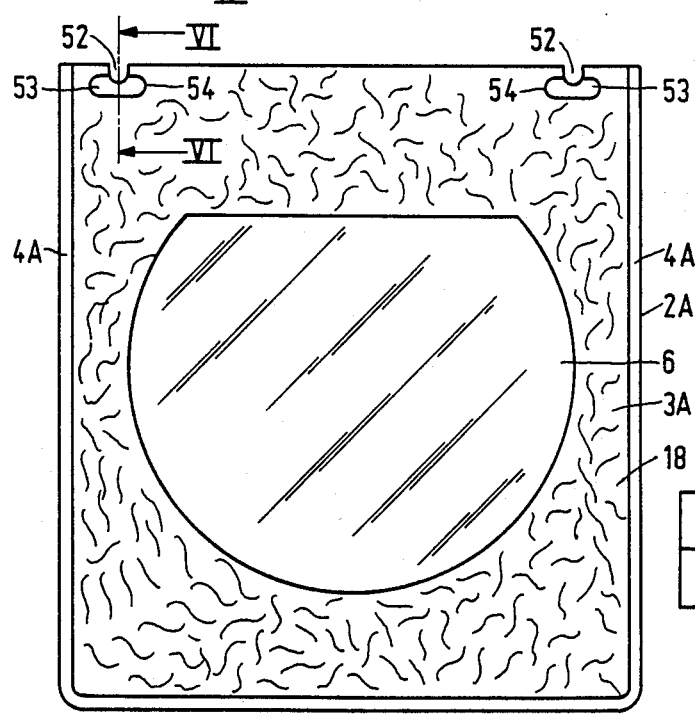
FIG.5
FIG.6

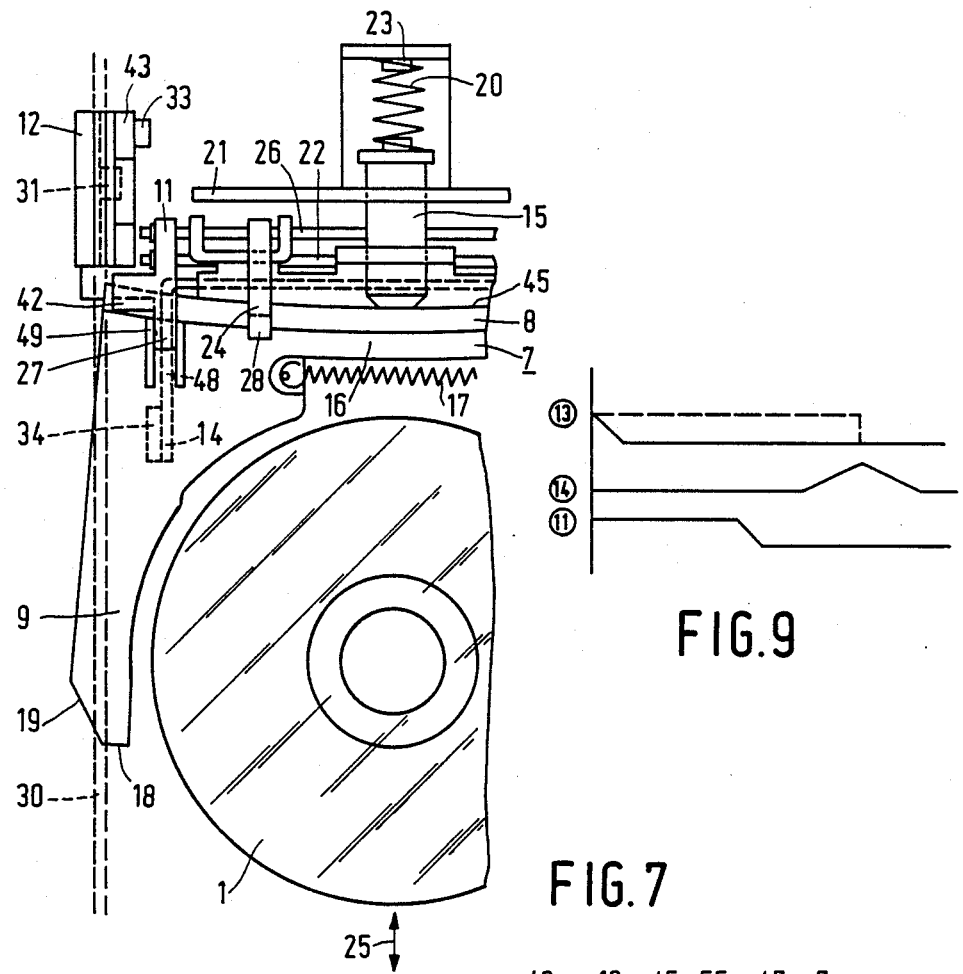
FIG.7
FIG.9
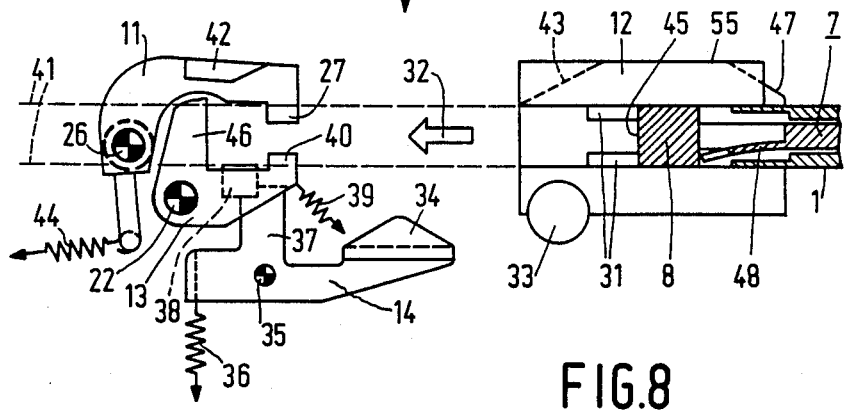
FIG.8

SYSTEM FOR RECORDING/READING INFORMATION ON/FROM A DISC, COMPRISING A DISC CASSETTE AND AN APPARATUS

BACKGROUND OF THE INVENTION

The invention relates to a disc reading system including a disc cassette and an apparatus into which the cassette is introduced. The disc cassette includes a rotatable disc, an external sleeve with a front opening which communicates with a disc-receiving space, an internal disc holder comprising a shutter for closing the front opening of the sleeve, and a pair of retaining means for retaining the disc and the disc holder as a unit inside the sleeve. The retaining means are movable relative to each other between a retaining position in which the disc is retained and a free position in which the disc is free to move relative to the disc holder. Latching means are movable with the aid of external means from a latching position in which the disc holder is latched in the sleeve and a free position in which the disc holder can be slid out of the sleeve. The apparatus includes disc-cassette release means for releasing the disc holder of an introduced disc cassette, and an extraction mechanism for extracting the disc-holder/disc unit from the sleeve and retaining the unit inside the apparatus during withdrawal of the sleeve.

Systems of this type are in use in which the disc is provided with video information which can be read by capacitive means and can be reproduced by means of a television set (see for example U.S. Pat. No. 4,361,884, hereby incorporated by reference). In these known video-disc systems it is desirable that the video disc is always, i.e. both when situated inside and outside the apparatus, protected against dust and touching. Nevertheless it should be easy to play the disc inside the apparatus. By accommodating the video disc in a disc cassette and removing the sleeve after insertion of the disc cassette into the apparatus the video disc can be played in the protective environment inside the apparatus. After playing, the sleeve is reinserted into the apparatus and the video disc is thus slid into the sleeve, so that after latching of the disc holder in the enclosure an easy-to-handle disc cassette is obtained, which adequately protects the video disc outside the apparatus.

U.S. Pat. No. 4,463,850 (hereby incorporated by reference) describes a disc-cassette intended for a system of the type defined in the opening paragraph. In this known disc cassette the retaining means of the internal disc holder comprise two jaws, at radially opposite portions of the periphery of the disc, which are free at one end and which are integral with the shutter at the other end. This unit is made of plastic and comprises two latching members which are integral with the jaws for latching the shutter in the side walls of the sleeve. The plastics jaws can deflect elastically between a position in which the disc is clear of the shutter and can thus be rotated and a position in which the jaws are deflected towards one another against the elasticity of the plastic to retain the disc in this position. This movement of the jaws towards one another is obtained by cooperation with the innerside of the two side walls of the sleeve at the instant at which the sleeve takes up the assembly comprising the shutter and the disc. If this assembly is again removed from the sleeve, the two jaws move outwards under the influence of the elasticity of the plastics, thereby releasing the disc.

A system comprising this known disc cassette has certain disadvantages. Plastic is known to exhibit some degree of relaxation under load, i.e., the elastic reactive force exerted by the plastic part decreases in the course of time. Thus, under the influence of a load the plastics may become permanently deformed in the long run. Some plastics have the property that after removal of the external load the deformation produced during relaxation is gradually eliminated partly or wholly, so that eventually the relevant part at least partly resumes its original position and its original resilience is restored.

As a disc cassette intended for a system as defined in the opening paragraph must be suitable for prolonged storage, it is not unlikely that as a result of relaxation the jaws are deformed to such an extent that after the disc holder/disc unit has been extracted from the sleeve and is retained in the apparatus the disc is no longer completely released from the disc holder. This may seriously disturb the operation of the apparatus, to such an extent that it is no longer possible to record or read information on/from the disc. Depending on the construction of the apparatus this may even lead to a permanent damage to the disc. In some known systems of the type intended here the apparatus employs mechanisms for lowering or lifting the disc out of the plane of the disc holder. If the disc holder obstructs this movement of the disc, the disc may be damaged or deformed. In particular if the disc contains computer information permanent damaging of the disc may have very undesirable consequences.

Another disadvantage of the known disc cassette is that if the disc holder together with the disc is removed from the sleeve outside the apparatus, on purpose or inadvertently, the disc may fall and be damaged. A further disadvantage is that when the disc cassette is closed the jaws press resiliently against the side walls of the sleeve which is generally also made of plastic. Thus, in the long run it is possible that the sleeve is deformed, which may give rise to problems when loading the disc cassette into the apparatus. A rattle free enclosure of the disc in the disc cassette is not guaranteed and is in fact impossible. The dimensions of the various parts which cooperate with each other can never be adapted to each other in such an accurate manner that the disc is situated in the disc holder and the disc holder in the sleeve exactly without any clearance between the disc holder and the disc and without large stresses being exerted on the disc periphery. Large stresses are very undesirable because they may lead to such a deformation of the disc that it can no longer be played. Moreover, the likelihood of deformation of the side walls of the sleeve increases substantially and is, in principle, even inevitable.

SUMMARY OF THE INVENTION

It is the object of the invention to provide a system in which the simplicity of the disc cassette of the known system is maintained, but also guarantees a rattle-free storage of the disc in the sleeve without causing problems as result of relaxation of the plastics used and further guarantees that after insertion of the disc holder/disc unit into the apparatus the disc is always clear of the disc holder for its rotary drive. To this end the invention is characterized in that outside the sleeve the disc-retaining means are movable relative to each other from the retaining position to the free position by external means only, so that outside the sleeve the disc holder and the disc also constitute a disc-holder/disc unit as long as the retaining means have not been moved to the release free position by the external means. The apparatus has disc-release means which cooperate with the disc-retaining means of an inserted disc-holder/disc unit to move the disc-retaining means relative to each other from the retaining position to the release free position. In contrast to the known system, the disc is always retained by the disc holder unless the disc-retaining means are moved into a position in which the disc is clear of the disc holder with the aid of external means. Since the apparatus comprises disc-release means for moving the disc-retaining means, it is possible to guarantee that inside the apparatus the disc is always clear of the disc-retaining means.

In view of a rattle-free storage of the disc in the disc cassette, an embodiment of special interest is characterized in that the disc holder comprises elastic means which elastically urge the retaining means towards the retaining position, so that the disc can be removed from a disc-holder/disc unit which is situated outside the sleeve only by external means which move the retaining means against the elastic force, and in that in the retaining position the retaining means retain the disc elastically and at least substantially rattle-free.

It is even possible to use a disc holder which is made entirely of plastic if this holder is designed to allow for relaxation effects in such a way that always such a residual elasticity is guaranteed that a certain clamping force exists between the disc and the disc holder. However, it is preferred to dimension the disc holder in such a way that the disc is retained in the enclosure by the disc-retaining means not in a completely but in a substantially rattle-free manner. Indeed, in the event of shocks or other impact forces the disc will come into contact with the resilient portions of the disc holder, so that these forces can be absorbed resiliently.

In an embodiment in which the disc cassette bears some resemblance to that known from U.S. Pat. No. 4,463,850, the shutter of the disc holder comprises at least one hinge having a hinge axis perpendicular to the disc surface, and the retaining means comprise two jaws, at radially opposed portions of the periphery of the disc, which are free at one end and which are connected to the shutter portion at the other end. The jaws are movable between the retaining position and the release position by a pivotal movement of the portions of the shutter about the hinge axis. In the known disc cassette the jaws have to be deformed to retain the disc but in accordance with the invention the jaws have to be deformed to release the disc. In combination with a suitable apparatus this nevertheless yields a system which has all the advantages of the prior art. However, if desired, the retaining means of the disc cassette may have an entirely different shape and may include a plurality of parts and, for example, metal springs. It is even possible to use a construction in which parts have to be moved relative to each other with friction so that a displacement against spring force is not necessary for moving the disc-retaining means between the retaining position and the free position.

When the retaining means are constituted by jaws, the disc holder is preferably made in one piece of a plastic and the hinge is an elastically deformable portion of the shutter. In systems of the type described here the shutter is generally of a more robust construction than the retaining means, so that it may be advantageous to integrate the hinge in the shutter and to construct the disc-release means in the apparatus to cooperate with the shutter.

In such a system the disc-release means preferably includes hold means which hold the shutter of the disc holder near each of its ends, pressure means between the hold means and movable relative thereto between an operative and an inoperative position and press against the front of the shutter in the plane of the disc holder, and elastic means which elastically load the hold means and the pressure means relative to each other towards the inoperative position. When a disc-holder/unit is present in the apparatus an elastic bending moment is then exerted on the shutter of the disc holder to expand the jaws towards the free position. The advantage of this is that the disc-release means are situated at a location inside the apparatus where, when a disc-holder/disc unit is present, these means are disposed directly opposite the shutter of the disc holder and are consequently not situated in the path of movement of the disc-holder/disc unit inside the apparatus during insertion and removal of the disc cassette. In order to minimise the number of movable parts in the apparatus it is advantageous for the hold means to be arranged at a fixed location and the pressure means to be elastically movable.

In order to preclude undesired displacements of the disc holder inside the apparatus, the apparatus may include at least one positioning member adapted to cooperate with the disc holder to inhibit displacements of the disc holder in a direction perpendicular to the axis of rotation of the disc and perpendicular to the directions of insertion and removal of the disc cassette. The positioning members ensure that the disc holder assumes the correct position when the disc cassette is inserted into the apparatus. Therefore, the position occupied by the apparatus is irrelevant. As a result of this, the system is suitable for operation in a horizontal, vertical or any other desired position.

In order to prevent an excessive deformation of the disc holder inside the apparatus, an embodiment is of interest which is characterized in that positioning members are provided on opposite sides of the pressure means, in that the positioning members function as stops which limit the movement of the retaining means from the retaining position to the free position and thus define the ultimate free position, and in that the disc holder is formed with recesses for engagement with those portions of the positioning members which cooperate with said holder. The recesses in the disc holder are important to prevent movements in the plane of the disc in the transverse direction.

In an embodiment of the invention in which the disc-retaining means can perform a pivotal movement to release the disc, the pivotal movement may give rise to undesired tilting of the disc. As a result of this the disc may not occupy the correct position in the player. Another problem may be that the disc does not resume its correct position in the disc-retaining means when it is re-inserted, which gives rise to problems when the sleeve is re-introduced into the apparatus. In an embodiment which does not present this problem and the retaining means include means adapted to cooperate with the disc periphery and situated radially opposite each other at the disc periphery, the oppositely disposed retaining means being radially translatable relative to one another.

Preferably the disc-retaining means include two jaws, one at each side of the disc, which are each free at one end and connected to the shutter at the other end. This embodiment is characterized in that the retaining means comprise two jaws, one at each side of the disc, which are each free at one end and connected to the shutter at the other end, and in that at least one of the jaws is connected to the shutter by means of a parallel guide, so that the relevant jaw is movable in a direction which is at least substantially parallel to the shutter. A simple type of parallel guides is obtained in a further embodiment, which is characterized in that the parallel guide comprises a plurality of parallel bar-shaped springs which are spaced from each other and which are disposed substantially perpendicularly to the direction of translation.

BRIEF DESCRIPTION OF THE DRAWING

FIG. 3 is a plan view of a disc-holder/disc unit of the disc cassette shown in FIGS. 1 and 2, FIG. 4 is a sectional view taken on the lines IV—IV in FIG. 3, FIG. 5 is a view of one of the halves of the external sleeve of the disc cassette shown in FIGS. 1 and 2, FIG. 6 is a sectional view taken on the lines VI—VI in FIG. 5, FIG. 7 shows diagrammatically a part of the interior of an apparatus forming part of a system in accordance with the invention and containing a disc holder and disc, the disc holder being in the free position in which the disc can be played, FIG. 8 shows some parts of the apparatus of FIG. 7 and a portion of the disc cassette which can cooperate with said parts, FIG. 9 is a timing diagram illustrating the movements performed by the three levers in FIG. 8.

DETAILED DESCRIPTION OF THE INVENTION

Figure 1:
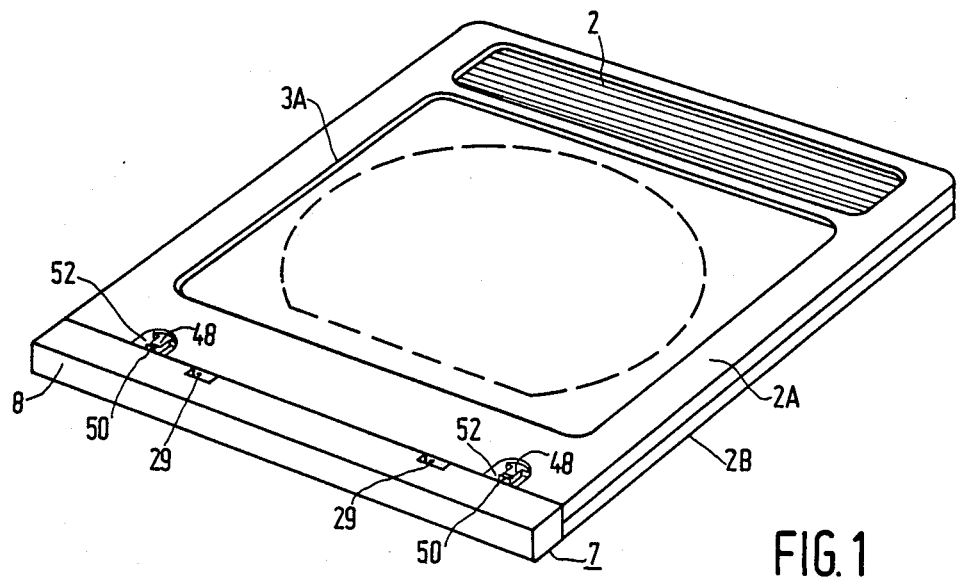
FIG. 1 is a perspective view of a disc cassette for use in a system in accordance with the invention.

The rotatable disc 1 may be an optical disc but alternatively it may be a disc of an entirely different type, for example a disc which can be scanned magnetically or mechanically. The embodiment of the invention shown in the drawings has been designed for use in conjunction with an optical disc having dimensions corresponding to those of the known optical audio discs, generally referred to as Compact Discs or CD discs. Instead of audio information CD discs may contain information of a different kind, for example digital data, so that the disc is suitable as an optical storage disc also referred to as a CD-ROM or CD Read Only Memory. Although CD discs for audio purposes are generally not accommodated in a disc cassette, this is frequently desirable for CD-ROM discs, in view of the nature of the information stored on these discs.

The disc 1 is accommodated in an external sleeve 2 comprising two fully identical shells 2A and 2B. The shell 2A, see FIG. 5, comprises a main wall 3A, side walls 4A, and a rear wall 5A. Similarly, the shell 2B comprises a main wall, side walls and a rear wall. Opposite from the rear wall, the sleeve 2—when assembled—has a front opening which communicates with the disc-receiving space. The shells are made of a transparent plastic and have a substantially matt surface structure, except for a central window 6 which is transparent.

The disc-receiving space can accommodate an internal disc holder 7 together with the disc 1. The disc holder has a shutter 8 for closing the front opening of the sleeve 2 and retaining means in the form of jaws 9 for retaining the disc. The disc holder and the disc retained by this holder together constitute a disc-holder/disc unit inside the sleeve. The retaining jaws 9 are movable relative to each other between a retaining position (see FIG. 3), in which the disc is retained, and a free position (see FIG. 7), in which the disc is free to be rotated relative to the disc holder.

For locking the disc holder in the sleeve the disc holder comprises two latching means 10 which are movable by external means from a latching position, in which the disc holder is latched inside the sleeve, and a free position, in which the disc holder can be slid out of the enclosure.

Referring to FIGS. 7 and 8, the apparatus which forms part of the system includes disc-cassette release means 11 for releasing the disc holder of an inserted disc cassette and an extraction mechanism 12-14 for extracting the disc holder and the disc from the sleeve and retaining these inside the apparatus during withdrawal of the sleeve.

The disc-retaining jaws 9 are movable relative to each other, when outside the sleeve, from the retaining position shown in FIG. 3 to the free position shown in FIG. 7 by external means only. Thus, the disc holder and the disc constitute a unit when outside the sleeve 2, as long as the retaining jaws 9 have not been set to the free position by external means. This has the advantage that the further disc-holder/disc unit can readily be removed from the enclosure for purpose of periodic inspection and that a user can easily replace the disc in a disc cassette without risk of damage. It is also possible to supply the user with an empty disc cassette to be provided with a disc by the user.

Referring to FIG. 7, disc-release means 15 cooperate with the disc-retaining jaws 9 to move the disc-retaining means relative to each other from the retaining position to the free position.

As is apparent in particular from FIGS. 3 and 7, the disc holder 7 is made in one piece from a plastic having elastic properties, such as polycarbonate. The disc holder is injection-molded in a basic shape that has to be deformed elastically to release the disc. The shutter 8 functions as the elastic means which urges the retaining jaws 9 elastically towards the retaining position.

In the embodiment shown the elastic means further includes a tension spring 17, but it is envisaged that when a suitable plastic is used it is not necessary to employ such a spring. The advantage of the use of the tension spring 17 is that relaxation effects in the plastic cannot lead to the disc not being retained or not being retained adequately. However, a disadvantage is that an additional part has to be used and that in the retaining position nearly always some pressure is exerted on the disc periphery. Preferably, this is to be avoided in view of deformation of the disc. In the ideal case the disc is retained by the retaining means in the retaining position exactly without clearance and without radial pressure being exerted. In view of dimensional and manufacturing tolerances, which are inevitable in practice, this ideal case can hardly ever be realized. Nevertheless, it is important that it is attempted to retain the disc stress-free and that any retaining forces which do occur are only of a secondary nature.

In the ideal case the disc holder has some clearance relative to the side walls of the sleeve. This enables the disc-retaining means to deflect resiliently outwards in the event of external shocks to absorb the shock. The clearance should not be such that the disc can come loose of the disc-retaining means of the holder.

The shutter of the disc holder is pivotable about a hinge axis perpendicular to the surface of the disc 1 and extending substantially through the centre of the shutter 8. The retaining jaws 9 are located at radially opposed portions of the periphery of the disc. The jaws are free at their ends and are connected to the other portions of the shutter at their other ends. The jaws are movable between the retaining position and the free position by hinging the portions of the shutter about hinge axis substantially in the centre of the shutter 8, see FIG. 7. At the location of the free ends 18 of the jaws, bevelled portions 19 facilitate insertion of the disc-holder/disc unit into the sleeve, even when the plastic has relaxed after a prolonged presence in an apparatus. Once inside the sleeve the jaws will resume their initial position after some time. In the retaining position the disc engages in grooves 56 in the inner sides of the jaws 9. The grooves have such a depth that the disc cannot become disengaged from the grooves in the case of a maximum flexure of the jaws inside a sleeve.

Referring to FIGS. 7 and 8, disc-release means include two hold levers 11 which retain the shutter 8 of the disc holder 7 near each of the ends. A plunger 15 cooperates with the shutter 8 at a point situated halfway between the two hold levers 11. The plunger 15 is loaded by elastic means constituted by a compression spring 20, so that the plunger is resiliently loaded towards an inoperative position. When a disc-holder/-disc unit is inserted into the apparatus the plunger is moved from its inoperative position, not shown, to the operative position shown in FIG. 7 against the pressure exerted by the spring 20. In this operative position the plunger exerts an elastic bending force on the shutter 8 of the disc holder 7 to expand the two jaws 9 towards the free position. The two hold levers 11 are pivotally mounted on a spindle 22 which is journalled in the frame 21 of the apparatus. The plunger 15 is movable in an axial direction relative to this frame and the compression spring 20 bears against a part of the frame 21 at its end 23 which is remote from the plunger 15. Thus, the hold levers 11 are arranged at fixed locations and the plunger 15 need only be movable in the plane of the disc 1.

Positioning levers 24 cooperates with the shutter 8, to prevent displacements of the disc holder in directions parallel and perpendicular to the directions of insertion and withdrawal of the disc cassette, as symbolised by the double arrow 25 in FIG. 7. Thus it is achieved that the disc holder 7 is always retained in exactly the same end position inside the apparatus during playing of the disc 1, regardless of the position of the apparatus. A correct return of the disc-holder/disc unit into the sleeve is thus guaranteed under all conditions. The positioning levers 24 not only serve for positioning the disc holder but also as stops for limiting the degree of flexure of the shutter 8 of the disc holder. This function is performed by the positioning levers in conjunction with the hold levers 11. The latter levers retain the disc holder 7 near the ends of the shutter 8, whilst the plunger 15 presses against the shutter 8 in its centre, thus causing the flexure. However, flexure is possible only until contact is made with the hooks 28 of the positioning levers 24. This means that the positioning levers 24 and specifically the hooks 28 define the free positions of the jaws 9. The release levers 11 and the positioning levers 24 have the same shape and are mounted on the same spindle 26. The hooks 28 of the positioning levers 24 have the same shape as the hooks 27 of the release members 11. The hooks 28 engage in recesses 29 in the shutter 8 of the disc holder (FIG. 1). Thus, the disc holder is positioned unambiguously in the plane of the drawing of FIG. 7 by means of the plunger 15 and the two positioning members 24.

How a disc cassette is inserted into and removed from the apparatus will now be described with reference to FIGS. 7 to 9. Two slides 12 are spaced at such a transverse distance from one another that they can receive the two corner portions of the disc cassette which are situated at the side of the shutter 8. By means of a guideway 30 in the apparatus, symbolically represented by a double broken line in FIG. 7, the slides are guided parallel to one another. The slides 12 have stops 31 against which the shutter abuts when the disc cassette is inserted. As the disc cassette is pushed further inwards the two slides are moved over the guideways 30 into the interior of the apparatus. FIG. 8 illustrates the situation in which the slide 12 is moved in the direction indicated by the arrow 32 by the disc cassette just before the slide reaches the location of the release lever 11, the hold lever 13 and a catching lever 14. Upon a further displacement to the left the projection 33 engages with the triangular projection 34 of the catching lever 14. The catching lever is pivotable about a spindle 35 and its left end is loaded by a tension spring 36 which tends to pivot the catching level anti-clockwise. The initial positions of the three levers 11, 13 and 14 as shown in FIG. 8 do not correspond to the normally obtained initial positions but rather illustrate the relative positions at the instant at which the disc holder is latched inside the apparatus. On its upper side the catching lever 14 carries a limb 37 which in the position shown cooperates with a projection 38 on the hold lever 13. The hold lever is loaded by a tension spring 39 which tends to pivot the lever about the spindle 22 in a clockwise direction, which in the situation shown is prevented by the cooperation between the limb 37 and the projection 38. As a result of the cooperation of the projection 33 of the slide with the projection 34 of the catching lever 14 the catching lever is pivoted about the spindle 35 in a clockwise direction as the slide 12 continues to move in the direction indicated by the arrow 32, so that the limb 37 is pivoted clockwise from underneath the projection 38 of the hold lever 13, which is also pivoted clockwise under the influence of the spring 39. The hook 40 of the hold lever 13 is now situated outside the path of the disc cassette, which path is indicated by the two broken lines 41. The release lever 11 comprises a lateral projection 42 which, as the slide 12 continues to move in the direction indicated by the arrow 32, contacts an inclined surface 43 at the front of the slide 12. The release lever is now loaded by a tension spring 44 which tends to pivot the release lever about the spindle 26 in a clockwise direction.

As a result of the cooperation of the projection 42 with the inclined surface 43, the hook 27 of the release lever 11 is pivoted out of the path 41 of the disc cassette which moves to the left in the direction indicated by the arrow 32, so that the disc cassette can be moved further to the left. The movement of the disc cassette to the left proceeds until the front 45 of the shutter 8 of the disc cassette abuts against the vertical portion 46 of the hold lever 13 to pivot this lever anti-clockwise into the position shown in FIG. 8. At the instant at which this position is reached the hook 40 engages in opening 46 in the sleeve of the disc cassette. In the meantime, the projection 42 of the release lever 11 has moved downwards along a second inclined surface 47 of the slide 12, so that the hook 27 has engaged the opposite opening 46 in the sleeve of the disc cassette facing the hook 40. As a result of the anti-clockwise movement of the hold lever 13 the catching lever 14 can also be pivoted anti-clockwise until the levers are positioned as shown in FIG. 8. In this position the hooks 27 of the release levers press against resilient projections 48 on the disc holder 7 of the disc cassette. These projections extend over recesses 49 and have free ends 50 which face the shutter 8. At the other ends they are integral with the disc holder. The resilient projections 48 are constructed in such a way that in their initial positions their ends 50 project slightly from the plane of the disc holder, see in particular FIG. 4. The free end 50 is slightly narrower than the remainder of the resilient projection 48, so that shoulders 51 are formed at some distance from the free end. The two shells 2A and 2B of the sleeve are each formed with narrow slots 52 which are open towards the front of the sleeve, which slots are engaged with clearance by the ends 50 of the resilient projections 48. The slots 52 terminate in broader recesses 53, which are slightly wider than the resilient projections 48. Thus, when the disc cassette is closed, the shoulders 51 of the resilient projections cooperate with the edge portion 54 of the recess 53, thereby latching the disc-holder/disc unit inside the sleeve. This disc cassette itself is described in U.S. Pat. No. 4,755,982 (hereby incorporated by reference).

Once the disc cassette occupies the end position inside the apparatus, the hooks 27 deflect the resilient projections 48, so that these projections no longer cooperate with the wall 54 of the recess 53. The two hooks 27 and 40 engage around the shutter 8 at the location of the narrow openings 52 in the sleeve. In this situation the sleeve can be withdrawn from the apparatus, the disc holder and consequently the disc remaining in the apparatus.

As the sleeve is removed from the apparatus the slide 40 is moved in a direction opposite to that indicated by the arrow 32 in FIG. 8. The hooks 27 of the two hold levers retain the shutter 8 of the disc holder 7, in conjunction with the hooks 28 of the positioning levers 24. The catching lever 14 is pivoted by the projection 33, allowing the release lever 13 to the pivoted clockwise under the influence of the tension spring 39. Also when the projection 33 becomes disengaged from the projection 34 and the catching lever 14 is allowed to pivot back in the anti-clockwise direction, this situation persists because the limb 37 of the catching lever 14 cannot engage underneath the projection 38 of the release lever 13. The resilient plastic projections 48 are deflected only elastically to release the disc holder from the sleeve and are no longer deflected once the sleeve has been withdrawn. In this way relaxation of the plastic is prevented.

The lines in FIG. 9 illustrate the situation when a full disc cassette is inserted into and subsequently removed from the sleeve. The reference numeral of the relevant lever is given to the left of each of these lines.

Figure 2:
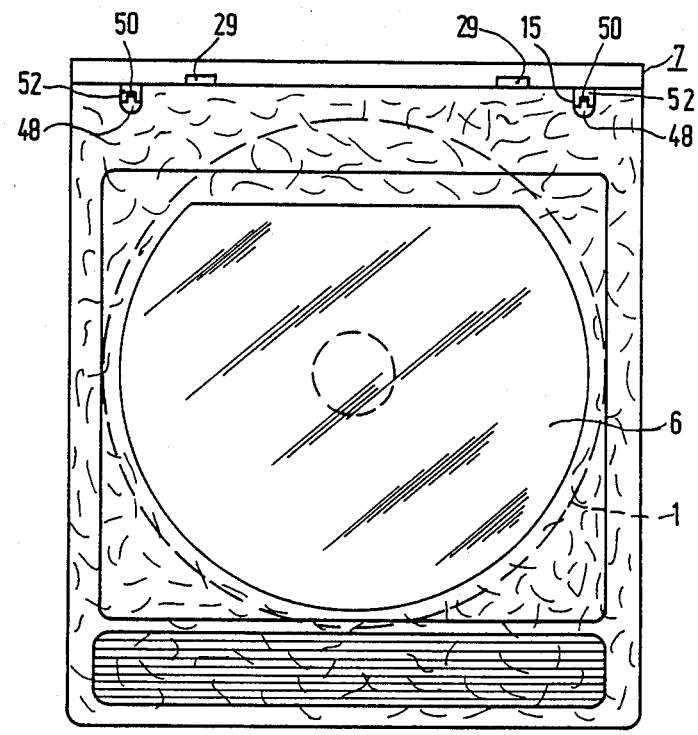
FIG. 2 is a plan view of the disc cassette shown in FIG. 1.
Figure 10:
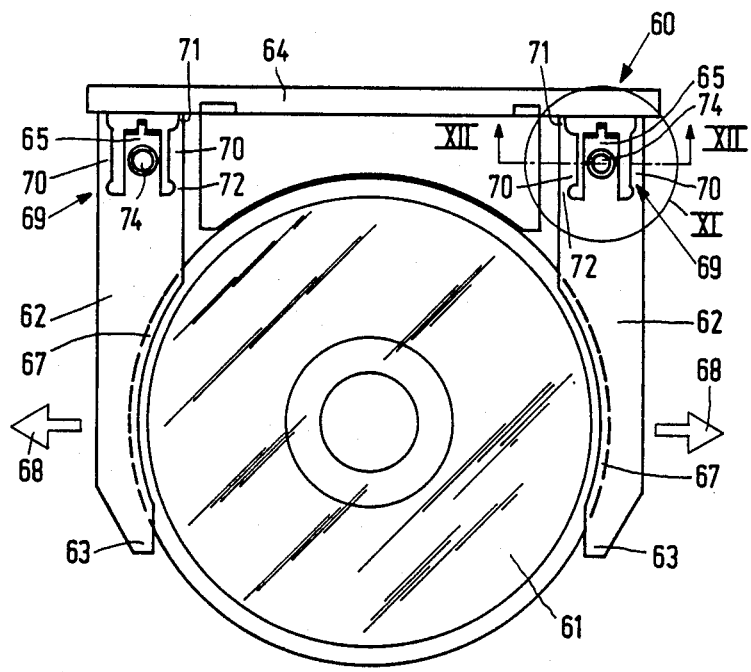
FIG. 10 is a plan view of a disc-holder/disc unit of a disc cassette.

Referring to FIG. 10, the disc holder 60 is made in one piece from a plastics and is constructed to engage in an external sleeve of the type as shown in FIGS. 1 and 2 of U.S. Pat. No. 4,755,982. The disc holder is and is given such a basic shape that it has to be deformed elastically to release the disc 61. The disc-retaining means comprise two identical jaws 62 at radially opposite portions of the periphery of the disc which are free at the ends 63 and which are connected to a shutter 64 at the other ends. The disc holder has latching means 65 which with the aid of external projections 66 to be described hereinafter are movable from a latching position in which a disc holder can be latched in a sleeve to a free position in which the disc holder can be slid out of a sleeve.

The jaws 62 are arranged radially opposite one another at the periphery of the disc 61 and have facing portions 67 which are formed with V-shaped grooves adapted to cooperate with the disc periphery. The facing portions 67 are radially translatable relative to one another, as is symbolised by the arrows 68 in FIG. 10.

For translating the portions 67 in the direction indicated by the arrows 68 each of the jaws 62 is connected to the shutter 64 by means of a parallel guide, so that the relevant jaw is movable in a direction at least substantially parallel to the shutter 64. The parallel guides 69 each comprise two bar-shaped springs 70 which are spaced from each other and which extend substantially perpendicularly to the direction 68 of translation. At the end each of the springs 70 has a narrowed portion 71 and 72 respectively, which portions have a higher elasticity than the other portions of the spring on account of the smaller cross-section.

Figure 11:
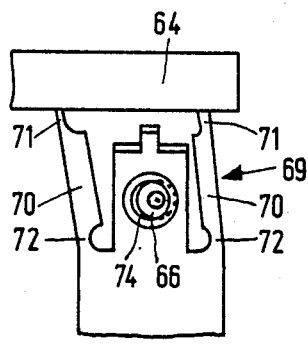
FIG. 11 is a slightly enlarged view of a detail within circle XI of FIG. 1 wherein the parallel guide has radially translated a retaining means over a small distance and FIG. 12 is a sectional view on a slightly enlarged scale taken on the lines XII—XII in FIG. 10.

The apparatus which is constructed to cooperate with the disc-holder/disc unit shown in FIG. 10 is not shown in the drawings. In contradistinction to the apparatus described previously, for moving the retaining jaws of the disc holder from the free position to the release position the embodiment shown in FIG. 10 employs two stationary pins 66. Each pine 66 has an upper portion 73 of frustoconical shape. The latching projection 65 of the disc holder is formed with an opening 74 which is adapted to cooperate with the pin 66. When the disc holder 60 is lowered in the direction indicated by the arrow 75 (FIG. 12), the upper portion 73 of the pin 66 engages in the opening 74 slight off center. As disc holder 60 is lowered onto the pin 66, the wall of the opening 74 first contacts the conical upper portion 73 at the right, so that a lateral force is exerted, giving rise to an elastic deflection as indicated in FIG. 11. For releasing the disc 61 a displacement of only 1 to 2 mm in the direction indicated by the arrow 68 is needed. Instead of lowering the disc holder 60 onto the pin 66 the same effect can be achieved by moving the pin 66 upwards relative to the disc holder.

Figure 12:
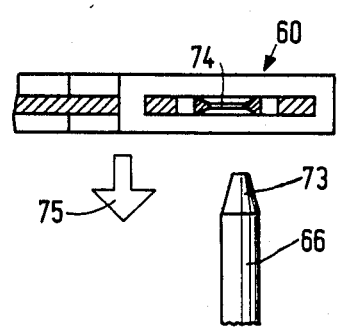

The use of a translation effectively precludes the problem of tilting of the disc. Other embodiments than those shown in FIGS. 10 to 12 are possible. For example instead of jaws it is possible to use other disc-retaining means, which need not necessarily be bodily movable. For example, it is possible to use diametrally opposed movable retaining means on an otherwise rigid disc holder. It is possible to use sliding blocks or the like which are movable against spring force or friction, but eccentrically rotatable means are also possible.

What is claimed is:

1. A system for recording/reading information on/-from a disc and comprising a cassette comprising a rotatable disc, an external sleeve having a front opening, and a disc holder receivable in said sleeve and having a shutter for closing said front opening and having a pair of retaining jaws which retain the disc to form a disc-holder/disc unit inside the sleeve, said jaws being connected to the shutter at opposite ends thereof and being movable relative to each other between a retaining position in which the disc is retained and a free position in which the disc is free to move relative to the disc holder, said disc holder further comprising elastic means which elastically urge the jaws toward the retaining position so that outside the sleeve the jaws can be moved to the free position only by external means, said shutter having at least one hinge axis perpendicular to the disc surface and about which said opposite ends of said shutter are pivoted to move the jaws between the retaining position and the free position, and apparatus comprising disc holder release means for releasing the disc holder of an introduced disc cassette, an extraction mechanism for extracting the disc-holder/disc unit from the sleeve and retaining said unit inside the apparatus during withdrawal of the sleeve, and disc release means which cooperate with the disc holder to pivot the opposite ends of the shutter about said at least one hinge axis so that said retaining jaws move from the retaining position to the free position.

2. A system as claimed in claim 1, characterized in that the disc holder (7) is made in one piece of a plastics and the at least one hinge comprises an elastically deformable portion (16) of the shutter (8).

3. A system as claimed in claim 1, characterized in that the disc-release means comprise hold means (11) which hold the shutter (8) of the disc holder (7) near each of its ends, pressure means (15) between the hold means, which pressure means are movable relative to the hold means between an operative and an inoperative position and press against the front of the shutter (8) in the plane of the disc holder (7), and elastic means (20) which elastically load the hold means (11) and the pressure means (15) relative to each other towards the inoperative position, so that when a disc-holder/disc unit is present inside the apparatus an elastic bending moment is exerted on the shutter (8) of the disc holder (7) to expand the jaws (9) towards the free position.

4. A system as claimed in claim 3, characterized in that the hold means (11) are arranged at a fixed location and in that the pressure means (15) are elastically movable.

5. A system as claimed in claim 4, characterized in that the apparatus comprises at least one positioning member (24) which is adapted to cooperate with the disc holder (7) to inhibit displacements of the disc holder in directions perpendicular to the axis of rotation of the disc and perpendicular to the directions of insertion and removal of the disc cassette.

6. A system as claimed in claim 5, characterized in that positioning members (24) are provided on opposite sides of the pressure means, the positioning members (24) function as stops which limit the movement of the retaining means from the retaining position to the free position and thus define the ultimate free position, and the disc holder (7) is formed with recesses (29) for engagement with those portions (28) of the positioning members (24) which cooperate with said holder.

7. A system as claimed in claim 1, characterized in that the apparatus comprises at least one positioning member (24) which is adapted to cooperate with the disc holder (7) to inhibit displacements of the disc holder in directions perpendicular to the axis of rotation of the disc and perpendicular to the directions of insertion and removal of the disc cassette.

8. A system as in claim 1 wherein the disc is retained in the disc holder at least substantially rattle free.

9. A system as in claim 1 wherein the disc release means comprises pressure means which presses against the shutter between the ends thereof.

* * * * *